United States Patent
Yano et al.

(10) Patent No.: US 9,707,629 B2
(45) Date of Patent: Jul. 18, 2017

(54) CUTTING TOOL

(71) Applicants: SUMITOMO ELECTRIC HARDMETAL CORP., Itami-shi, Hyogo (JP); SUMITOMO ELECTRIC INDUSTRIES, LTD., Osaka-shi, Osaka (JP)

(72) Inventors: Kazuya Yano, Itami (JP); Yoshinori Tanigawa, Itami (JP); Yoshikazu Yamashita, Itami (JP); Hiroyuki Shimada, Itami (JP); Kazuo Nakamae, Itami (JP)

(73) Assignees: SUMITOMO ELECTRIC HARDMETAL CORP., Itami-shi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 218 days.

(21) Appl. No.: 14/402,144

(22) PCT Filed: May 31, 2013

(86) PCT No.: PCT/JP2013/065181
§ 371 (c)(1),
(2) Date: Nov. 19, 2014

(87) PCT Pub. No.: WO2013/190977
PCT Pub. Date: Dec. 27, 2013

(65) Prior Publication Data
US 2015/0125226 A1  May 7, 2015

(30) Foreign Application Priority Data
Jun. 21, 2012 (JP) ................................. 2012-139469

(51) Int. Cl.
*B23C 5/02* (2006.01)
*B23C 5/10* (2006.01)
(Continued)

(52) U.S. Cl.
CPC ........ *B23C 5/1018* (2013.01); *B23K 26/0072* (2013.01); *B23K 26/0084* (2013.01);
(Continued)

(58) Field of Classification Search
CPC ............ B23K 26/0078; B23K 26/0072; B23C 2226/31; B23C 2226/315; B23C 5/1018
See application file for complete search history.

(56) References Cited

U.S. PATENT DOCUMENTS

| 5,026,960 | A  | 6/1991 | Slutz et al. |
| 6,353,204 | B1 | 3/2002 | Spaay et al. |

(Continued)

FOREIGN PATENT DOCUMENTS

| CN | 1836811 A   | 9/2006  |
| CN | 101080296 A | 11/2007 |

(Continued)

OTHER PUBLICATIONS

Jan. 4, 2016 Extended Search Report issued in European Patent Application No. 13806626.1.
(Continued)

*Primary Examiner* — Daniel Howell
*Assistant Examiner* — Alan Snyder
(74) *Attorney, Agent, or Firm* — Oliff PLC

(57) ABSTRACT

A cutting tool includes a portion made of a high hardness material. The portion includes a rake face, a flank face, and a cutting edge. The rake face is divided into a region A along the cutting edge and a region B excluding the region A of the rake face, a surface roughness of the region A is smaller than a surface roughness of the region B, and the region B is deepened with respect to a position of the region A.

6 Claims, 3 Drawing Sheets

(51) Int. Cl.
  *B23K 26/00*  (2014.01)
  *B23P 15/28*  (2006.01)
  *B23K 26/364*  (2014.01)
  *B23K 26/40*  (2014.01)
  *B23K 101/20*  (2006.01)
  *B23K 103/04*  (2006.01)
  *B23K 103/00*  (2006.01)

(52) U.S. Cl.
  CPC ............ *B23K 26/364* (2015.10); *B23K 26/40* (2013.01); *B23P 15/28* (2013.01); *B23C 2200/086* (2013.01); *B23C 2226/125* (2013.01); *B23C 2226/31* (2013.01); *B23C 2226/315* (2013.01); *B23K 2201/20* (2013.01); *B23K 2203/04* (2013.01); *B23K 2203/50* (2015.10); *B23K 2203/52* (2015.10); *Y10T 407/245* (2015.01)

(56) References Cited

U.S. PATENT DOCUMENTS

| | | | |
|---|---|---|---|
| 6,524,036 | B1 | 2/2003 | Kolker |
| 2004/0213639 | A1 | 10/2004 | Ueda et al. |
| 2013/0292188 | A1* | 11/2013 | Bilen ................. E21B 10/5676 175/428 |

FOREIGN PATENT DOCUMENTS

| | | |
|---|---|---|
| EP | 0 425 812 A2 | 5/1991 |
| EP | 1 762 321 B1 | 8/2009 |
| JP | A-3-178736 | 8/1991 |
| JP | A-2000-71110 | 3/2000 |
| JP | A-2003-25118 | 1/2003 |
| JP | A-2004-344957 | 12/2004 |
| JP | 2007-118126 A | 5/2007 |
| JP | A-2007-216327 | 8/2007 |
| JP | A-2008-229810 | 10/2008 |
| JP | 2011-088264 A | 5/2011 |
| WO | WO 03/015968 A1 | 2/2003 |
| WO | 2006/098317 A1 | 9/2006 |

OTHER PUBLICATIONS

International Search Report issued in International Patent Application No. PCT/JP2013/065181 dated Jun. 25, 2013.

Nov. 3, 2015 Office Action issued in Chinese Patent Application No. 201380032705.5.

* cited by examiner

CUTTING TOOL

TECHNICAL FIELD

The present invention relates to a cutting tool that includes a portion involved in cutting, at least the portion being made of a high hardness material such as diamond, and also relates to a method for manufacturing the cutting tool.

BACKGROUND ART

A cutting tool for precision cutting includes a portion involved in cutting that is made of a material that has a high hardness and a high resistance to polishing, such as diamond.

As in the case of a general-purpose cutting tool, this cutting tool for precision cutting also includes a rake face, a flank face, and a cutting edge, formed of a ridge at a position at which these faces meet.

Since the portion involved in cutting is made of a material such as diamond having a high hardness, operations such as cutting of the material or deepening of the rake face are performed by laser machining during manufacturing of this cutting tool for precision cutting. Manufacture of tools using a laser machine has been disclosed in, for example, Patent Literatures (PTLs) 1 to 3.

CITATION LIST

Patent Literature

PTL 1: JP 2003-25118 A
PTL 2: JP 2004-344957 A
PTL 3: JP 2008-229810 A

SUMMARY OF INVENTION

Technical Problem

A surface formed on a high hardness material by being processed by a laser machine hardly ever has a smooth surface roughness. For this reason, the cutting tool having a rake face or a flank face processed by laser beams does not operate stably. As a countermeasure to address this problem, the surface of the tool, particularly the rake face, has been subjected to machine polishing or grinding to increase the surface smoothness. However, since the material to be processed is hard, the existing method of polishing the entire rake face is disadvantageous in that it takes a long time for polishing or grinding.

This polishing or grinding causes a load on an polisher or a grinder, resulting in another problem of a cost increase.

To address this, the present invention aims to stabilize the cutting performance of a cutting tool for precision cutting by reducing the area subjected to polishing or grinding during manufacturing of the tool.

Solution to Problem

In order to solve the above-described problems, the present invention provides a cutting tool including a portion made of a high hardness material in the following manner.

Specifically, the portion includes a rake face, a flank face, and a cutting edge, formed of a ridge at a position at which the rake face and the flank face meet, and the rake face is divided into a region A along the cutting edge and a region B excluding the region A of the rake face, a surface roughness of the region A is smaller than a surface roughness of the region B, and the region B is deepened with respect to a position of the region A.

In this structure, the region A of the rake face can be a surface smoothed by machining (polished or ground surface) and the region B is an unsmoothed surface processed using laser beams.

The present invention is also applicable to a cutting tool in which a sintered cubic boron nitride (CBN) compact is used as the high hardness material. When the present invention is applied to a cutting tool in which diamond is used, which is so hard that roughing of the rake face is inevitably dependent on laser machining, the effects of the present invention are particularly significantly exerted.

Diamond used for the cutting tool of the present invention may be any one of monocrystalline diamond, sintered diamond, and polycrystalline diamond manufactured by a vapor deposition formation method. In the cutting tool of the present invention, the region A of the rake face is preferably composed of a single surface.

The cutting tool can be manufactured by the following method in which, firstly, the rake face is processed on the high hardness material by a laser machine, and in the laser machining step, the region B of the rake face is deepened so as to be deeper than the region A and then the region A of the rake face is smoothed by machine polishing or grinding to form a cutting edge between the rake face and the flank face. The present invention also provides this manufacturing method.

The effects of the present invention can be obtained also when part of the region B is subjected to deepening by this method.

It is preferable in this method that the flank face be also polished or ground. The polishing or grinding of the flank face may be performed either before or after the smoothing of the rake face.

Advantageous Effects of Invention

In the cutting tool according to the present invention, the rake face is divided into a region A along the cutting edge and a region B excluding the region A of the rake face, and the region B is deepened with respect to the position of the region A. Thus, the cutting toll can be manufactured by a method of processing the regions A and B of the rake face using a laser machine and then smoothing the region A by machine polishing or grinding.

This method can minimize the area of the region A to be smoothed and significantly reduce the time for polishing and grinding.

Moreover, reduction of the area of the region A to be smoothed reduces a load on a polisher or a grinder during processing and thus reduces a processing cost.

DESCRIPTION OF EMBODIMENTS

Referring now to FIGS. 1 to 4(c), a cutting tool according to an embodiment of the present invention is described below.

Figure 1:
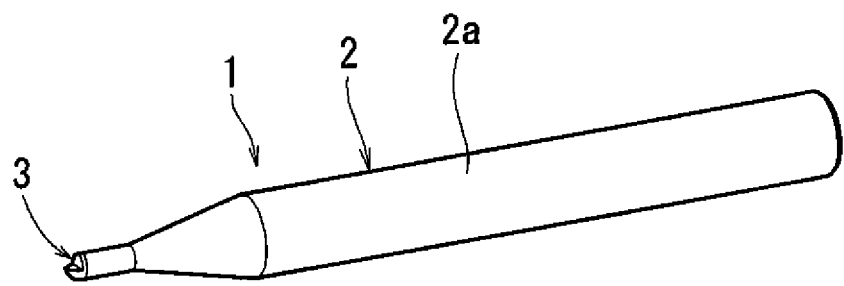
FIG. 1 is a perspective view illustrating an example of a cutting tool (ball end mill) according to the present invention.
Figure 2:
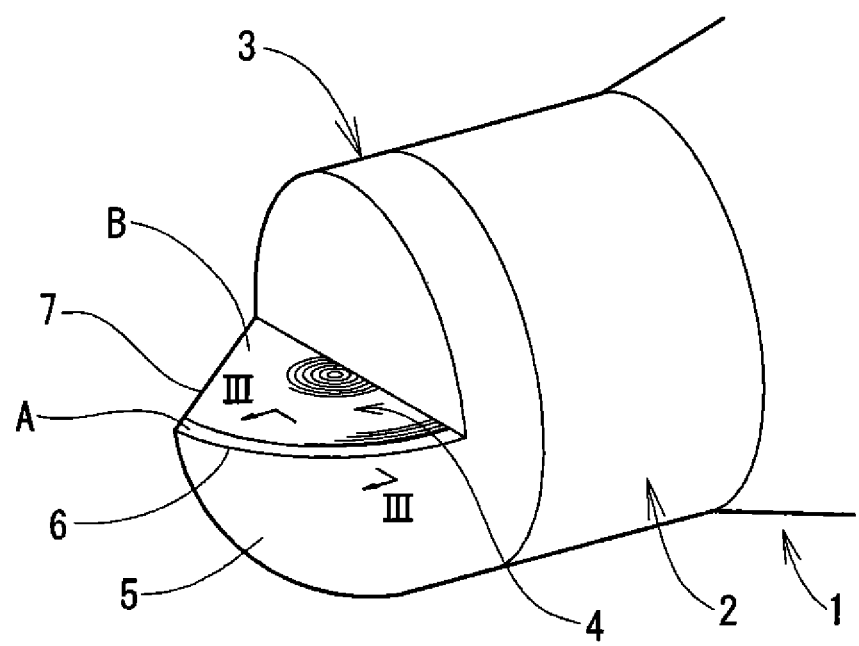
FIG. 2 is a perspective view of a main portion of the cutting tool illustrated in FIG. 1 in an enlarged manner.

FIGS. 1 and 2 illustrate an example in which the present invention is applied to a single-flute ball end mill having a radius at the end of 0.5 mm (diameter of 1 mm). A cutting tool (ball end mill) 1 thus illustrated includes a main portion 2, which includes a shank 2a, and a cutting head 3 connected to the end of the main portion 2 and made of a high hardness material. The cutting head 3 includes a rake face 4, a flank face 5, and a cutting edge 6, formed of a ridge at a position at which the rake face and the flank face meet.

The reference numeral 7 in the drawings denotes a removal surface beyond which a portion of the cutting head 3 that does not include the cutting edge 6 is removed.

The main portion 2 is made of tool steel such as high-speed steel or cemented carbide. The cutting head 3 is made of, for example, a binderless sintered diamond compact in which nanosized polycrystalline diamond is coupled without using a binder.

The rake face 4 formed in the cutting head 3 is divided into two regions including a region A, which is located along the cutting edge 6, and a region B, which is a region excluding the region A. The region B is slightly deepened with respect to a position of the region A and the surface roughness of the region B is larger than the surface roughness of the region A.

The region A is a surface subjected to machining, while the region B is a surface subjected to laser beam processing. The rake face 4 including these regions A and B is formed by being subjected to the following steps.

Figure 4A:
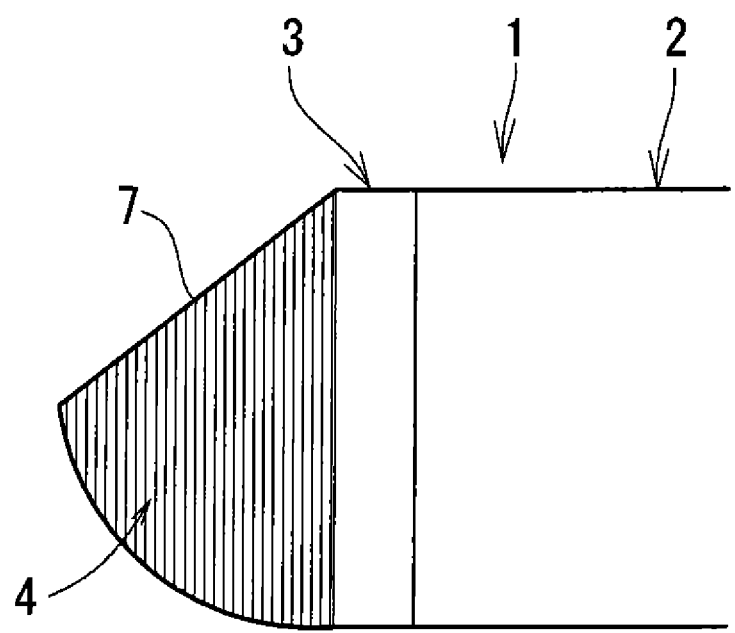
FIG. 4(a) illustrates a procedure of processing a rake face by a manufacturing method according to the present invention.

Specifically, the entirety of the rake face 4 is firstly processed by a laser machine, as illustrated in FIG. 4(a). This processing may be performed by irradiating the rake face 4 with laser beams in the direction in which the laser beams intersect the rake face 4 or in the direction in which the laser beams are parallel to the rake face 4.

Subsequently, a portion of the rake face 4 excluding the region A (that is, the region B) is further deepened by the laser machine. The illustrated cutting tool (ball end mill) is deepened by irradiating the region B of the rake face 4 with laser beams from immediately above the region B.

Figure 4B:
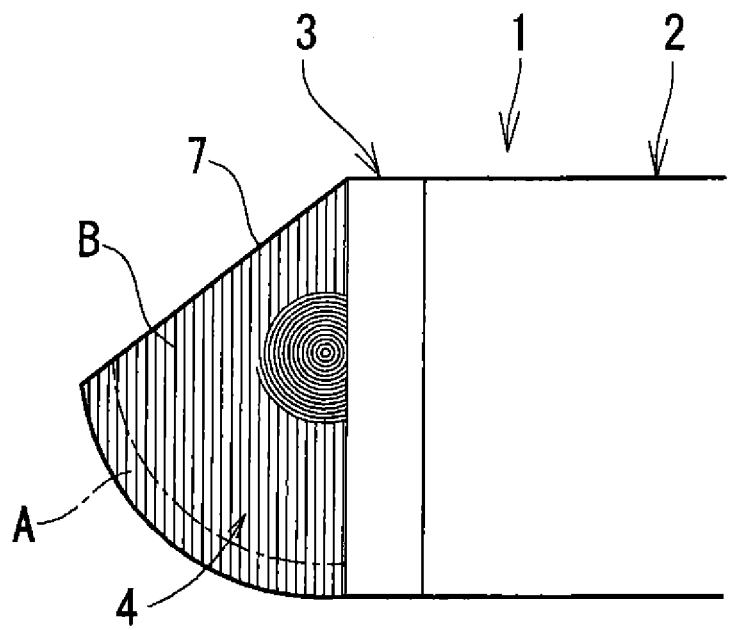
FIG. 4(b) illustrates a procedure of processing a rake face by the manufacturing method according to the present invention.

Here, if the laser beams are caused to pass over the region B so as to leave a semicircular processed portion as illustrated in FIG. 4(b), the width of the region A can be made uniform.

When the entirety of the region B is subjected to deepening, the effect of reduction of the area of the rake face to be processed is maximized. The area of the rake face to be ground can be also reduced by leaving a mountain having a peak at the same level as the region A between grooves produced by causing the laser beams to pass over the area, although the reduction is smaller than that in the case where the entire surface is subjected to deepening.

Figure 4C:
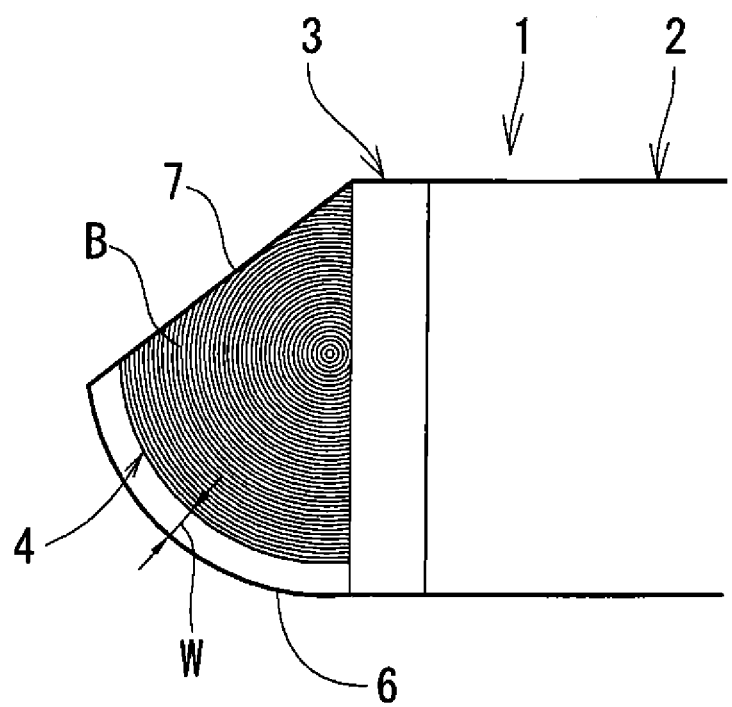
FIG. 4(c) illustrates a procedure of processing a rake face by the manufacturing method according to the present invention.

FIG. 4(c) illustrates the state in which the entire region B has been deepened while moving the position over which the laser beam is caused to pass in the radial direction of the end mill.

Figure 3:
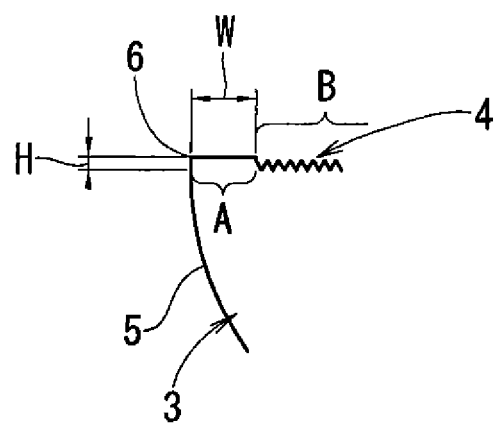
FIG. 3 is a cross-sectional view of a portion illustrated in FIG. 2 taken along the line III-III in an enlarged manner.

Here, the depth of the region B from the region A (the height H from the deepest point of the region B to the region A illustrated in FIG. 3) is preferably 100 μm or smaller so that wasteful deepening with laser beam can be avoided. The lowest limit of the depth may even be 1 μm. The width W of the region A illustrated in FIG. 4(c) is preferably 50% the diameter of the cutting edge 6 or smaller. In precision cutting, the depth of cut is typically set at a fine value smaller than or equal to 10 μm and thus a large value is not required for the width W. In terms of reduction of the area of the region A, a smaller width is better and the lower limit may be 1 μm.

When the deepening of the region B is completed, the region A is then finished by machine polishing or grinding. Since the region A has a small area and makes up a significantly small proportion of the entire rake face 4, time and labor taken for the machine polishing or grinding is significantly reduced.

The flank face 5 and the removal surface 7 are processed by the laser machine. The flank face 5 is finished by polishing or grinding before or after the region A of the rake face 4 is smoothed.

The flank face 5 may be processed only by the laser machine. However, as described above, if the region A of the rake face 4 and the flank face 5 are both subjected to polishing or grinding, a high-precision stable cutting edge can be obtained.

Objects to which the present invention is applicable are not limited to the illustrated ball end mill. The present invention is applicable to other end mills such as a square end mill or a radius end mill. The present invention is also applicable to cutting tools other than end mills, a precision turning tool, a cutting insert for tool, or boring tools such as a drill.

The cutting tool illustrated as an example includes a cutting head 3, the entire of which is made of a high hardness material. Instead, a high hardness material may be connected to a portion of the cutting head 3 and only a portion involved in cutting (a portion near the cutting edge) may be made of the high hardness material.

Alternatively, a high hardness material which a portion involved in cutting is made of may be monocrystalline diamond, sintered diamond, or polycrystalline diamond manufactured by a vapor deposition formation method. Also in the case where a sintered cubic boron nitride (CBN) compact is used, the effects of the present invention can be expected, although the effects are smaller than those in the case where diamond is used.

REFERENCE SIGNS LIST 1 cutting tool
2 main portion
2a shank
3 cutting head
4 rake face
A region along cutting edge of rake face
B region excluding region A of rake face
5 flank face
6 cutting edge
7 removal surface

The invention claimed is:
1. A cutting tool comprising a portion made of a high hardness material,
wherein the portion includes a rake face, a flank face, and a cutting edge, formed of a ridge at a position at which the rake face and the flank face meet, wherein the rake face is divided into a first region along the cutting edge and a second region excluding the first region of the rake face, a surface roughness of the first region is smaller than a surface roughness of the second region, and the second region is deepened with respect to a position of the first region, and wherein a depth of the second region from the first region is 1 μm or more and 100 μm or less.

2. The cutting tool according to claim 1, wherein the first region of the rake face is a surface smoothed by machine polishing or grinding and the second region is an unsmoothed surface subjected to laser machining.

3. The cutting tool according to claim 1, wherein the high hardness material is any one of monocrystalline diamond, sintered diamond, and polycrystalline diamond.

4. The cutting tool according to claim 1, wherein the first region of the rake face is composed of a single surface.

5. A method for manufacturing the cutting tool according to claim 1, comprising a laser machining step of forming the rake face on the high hardness material using a laser beam, wherein in the laser machining step, the second region of the rake face is deepened so as to be deeper than the first region and then the first region of the rake face is polished or ground to form a cutting edge between the rake face and the flank face.

6. The cutting tool according to claim 1, wherein the second region is disposed inside of the first region.

\* \* \* \* \*